United States Patent
Macek

(10) Patent No.: US 12,434,326 B2
(45) Date of Patent: Oct. 7, 2025

(54) METHOD FOR FRICTION STIR WELDING OR PROCESSING HIGH STRENGTH STEEL

(71) Applicant: FCA US LLC, Auburn Hills, MI (US)

(72) Inventor: Bryan Macek, Rochester Hills, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/474,290

(22) Filed: Sep. 26, 2023

(65) Prior Publication Data

US 2025/0100069 A1 Mar. 27, 2025

(51) Int. Cl.
| | |
|---|---|
| *B23K 20/00* | (2006.01) |
| *B23K 20/12* | (2006.01) |
| *B23K 20/24* | (2006.01) |
| *B23K 20/26* | (2006.01) |
| *B23K 103/04* | (2006.01) |

(52) U.S. Cl.
CPC .......... *B23K 20/1235* (2013.01); *B23K 20/24* (2013.01); *B23K 20/26* (2013.01); *B23K 2103/04* (2018.08)

(58) Field of Classification Search
CPC ............ B23K 20/1235; B23K 2103/04; B23K 2101/18; B23K 20/122; B23K 20/1255; B23K 20/24; B23K 20/26; B23K 2103/05; B23K 20/12; B23K 20/22; B23K 9/04
See application file for complete search history.

(56) References Cited

U.S. PATENT DOCUMENTS

| | | | | |
|---|---|---|---|---|
| 3,240,414 | A * | 3/1966 | Cannon | B23K 13/046 219/67 |
| 3,588,426 | A * | 6/1971 | Harriau | B23K 13/02 219/67 |
| 7,225,969 | B2 * | 6/2007 | Chen | C22C 21/02 228/2.1 |
| 7,992,759 | B2 * | 8/2011 | Steel | B23K 20/22 228/2.1 |
| 8,814,026 | B2 * | 8/2014 | Kato | B23K 20/1235 228/2.1 |
| 9,033,205 | B2 * | 5/2015 | Castillo | B23K 20/24 228/2.1 |
| 2006/0124701 | A1 * | 6/2006 | Chen | C22C 21/02 228/112.1 |
| 2010/0136369 | A1 * | 6/2010 | Ayer | B23K 20/1225 228/112.1 |

(Continued)

OTHER PUBLICATIONS

Stainless Inox; https://www.stainlessinox.com/blog/stainless-steel-304-sheet-uses-and-applications/, Apr. 8, 2022 (Year: 2022).*

(Continued)

*Primary Examiner* — Erin B Saad
(74) *Attorney, Agent, or Firm* — Jeremy J. Klobucar

(57) ABSTRACT

A method of processing high-strength steel includes providing a first piece of high-strength steel. Friction stir processing the first piece of high strength steel is performed by pre-heating an area in advance of a friction stir welding tool and moving the friction stir welding tool between 500 mm and 300 mm per minute to attain a mixed zone having a mixed zone temperature at the mixed zone between a eutectoid temperature and a forge welding temperature from a combination of the friction from the friction welding tool and the step of pre-heating.

4 Claims, 5 Drawing Sheets

(56) References Cited

U.S. PATENT DOCUMENTS

| | | | |
|---|---|---|---|
| 2010/0176182 A1* | 7/2010 | Hanlon | B23K 20/126 228/2.1 |
| 2010/0178526 A1* | 7/2010 | Fujii | B23K 20/1235 428/615 |
| 2011/0127311 A1* | 6/2011 | Peterson | B23K 37/0533 228/2.1 |
| 2013/0309023 A1* | 11/2013 | Takagi | B21D 15/00 427/407.1 |
| 2015/0041521 A1* | 2/2015 | Matsushita | C22C 38/04 228/112.1 |
| 2015/0083710 A1* | 3/2015 | Albrecht | B23K 9/167 219/601 |
| 2016/0167163 A1* | 6/2016 | Sugimoto | B23K 20/24 228/114.5 |
| 2016/0214203 A1* | 7/2016 | Taniguchi | C21D 9/50 |
| 2016/0221117 A1* | 8/2016 | Taniguchi | C21D 1/42 |
| 2016/0228981 A1* | 8/2016 | Matsushita | B23K 20/1235 |
| 2018/0043466 A1* | 2/2018 | Matsushita | B23K 20/1235 |
| 2018/0221984 A1* | 8/2018 | Toguyeni | B23K 20/122 |
| 2018/0283460 A1* | 10/2018 | Lock | F16D 3/44 |
| 2018/0311761 A1* | 11/2018 | Gierl-Mayer | B23K 20/1255 |
| 2019/0111514 A1* | 4/2019 | Matsushita | C22C 38/002 |
| 2020/0140970 A1* | 5/2020 | Singh | B23K 20/26 |
| 2020/0306871 A1* | 10/2020 | Matsushita | B23K 20/24 |
| 2022/0143900 A1* | 5/2022 | Nasserrafi | B29C 71/02 |
| 2022/0162723 A1* | 5/2022 | Fujii | C22C 38/00 |

OTHER PUBLICATIONS https://arcstainless.in/316-stainless-steel-properties/ (Year: 2025).*
JP2012040584A English computer translation (Year: 2012).*
Mohan, Dhanesh G. et al., "A Review on Friction Stir Welding of Steels", Chinese Journal of Mechanical Engineering, 2021, 29 pages.

* cited by examiner

METHOD FOR FRICTION STIR WELDING OR PROCESSING HIGH STRENGTH STEEL

FIELD

The present disclosure relates to generally to a method of joining steel and, more particularly, to a method for friction stir welding steel components.

BACKGROUND

This section provides background information related to the present disclosure which is not necessarily prior art.

Friction stir welding has been used for aluminum manufacturing for years. Because of the physical properties of aluminum, no phase changes occur during processing making the process relatively easy to implement. For automotive applications, high strength steel is desirable to be used in various locations. High strength steel is used in selected locations of a vehicle. For example, one component may be formed from a single sheet of steel. However, the single sheet may be composed of regions of different strength or different thicknesses or both. Processing options for high strength include laser welded blanks which combine a plurality of sheet steel of various thicknesses and mechanical properties via laser welding. Another process for processing steel is tailor rolled blanks that uses a cold rolling process to locally decrease the thickness of a sheet of steel to produce a variable thickness part after stamping. Tailor tempered parts utilized selectively heating and/or cooling with a press hardening operation to produce a steel part with different mechanical properties such as strength and ductility in different locations. The above technologies may be used singularly or together to produce a single stamping blank. The process of combining one or more of the processes above requires separate equipment and cycle time which is detrimental to cost and energy efficiency. The above technologies can also affect the mechanical properties of the resultant stamping blank. For example, tailor welded blanks produce a heat affected zone on both sides of the laser weld seam which is detrimental to the ability to stamp complex parts. The laser weld seam itself is also detrimental to forming because its strength and ductility are substantially different than the surrounding material. Tailor rolling requires that the various thickness zones be arranged in parallel fashion and requires an annealing process after the rolling process unless the part is formed using press hardening. Tailor tempering is only suitable for press hardened steel and does not have a clear analog for cold forming steel.

SUMMARY

This section provides a general summary of the disclosure and is not a comprehensive disclosure of its full scope or all of its features.

Friction stir welding is used to join a plurality of panels together. Friction stir processing is used to generate a work hardened surface or change material thickness used for advanced high strength steel or ultra-strength steel. Friction Stir processing is conducted within a single panel instead of being used to join a plurality of panels. Both Friction Stir Processing and Friction Stir Welding can be performed on the same workpiece with the same equipment and parameters.

In one aspect of the disclosure, a method of processing high-strength steel includes providing a first piece of high-strength steel. Friction stir processing the first piece of high strength steel is performed by pre-heating an area in advance of a friction stir welding tool and moving the friction stir welding tool between 500 mm and 300 mm per minute to attain a mixed zone having a mixed zone temperature at the mixed zone between a eutectoid temperature and a forge welding temperature from a combination of the friction from the friction welding tool and the step of pre-heating.

In another aspect of the disclosure, a method of processing high-strength steel includes providing a first piece of high-strength steel and providing a second piece of high-strength steel abutting the first piece of high strength steel. Friction stir welding the first piece of high strength steel and the second piece of high strength steel is performed by pre-heating a joint area in advance of a friction stir welding tool and moving the friction stir welding tool between 500 mm and 300 mm per minute to attain a mixed zone between the first piece and the second piece having a mixed zone temperature at the mixed zone between a eutectoid temperature and a forge welding temperature from a combination of the friction from the friction welding tool and the step of pre-heating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
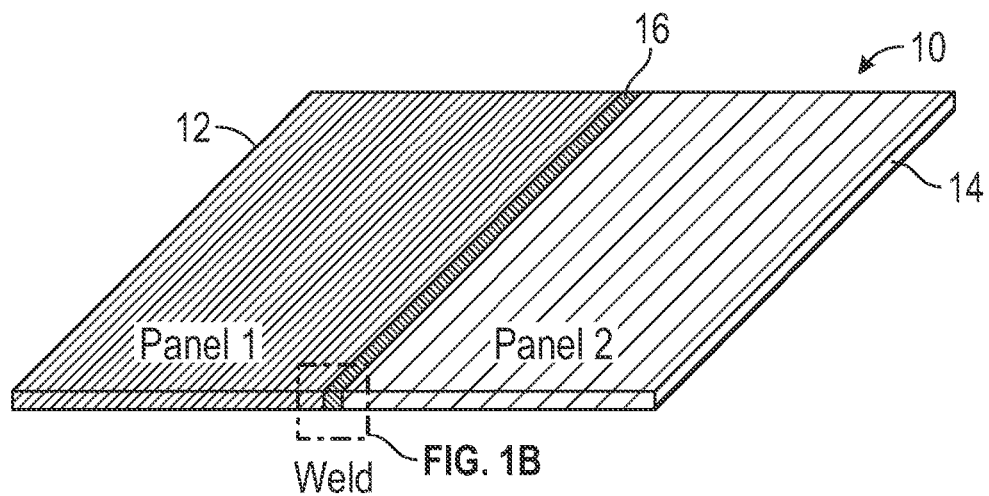
FIG. 1A is a perspective view of two channels joined at a mixed zone.
Figure 1B:
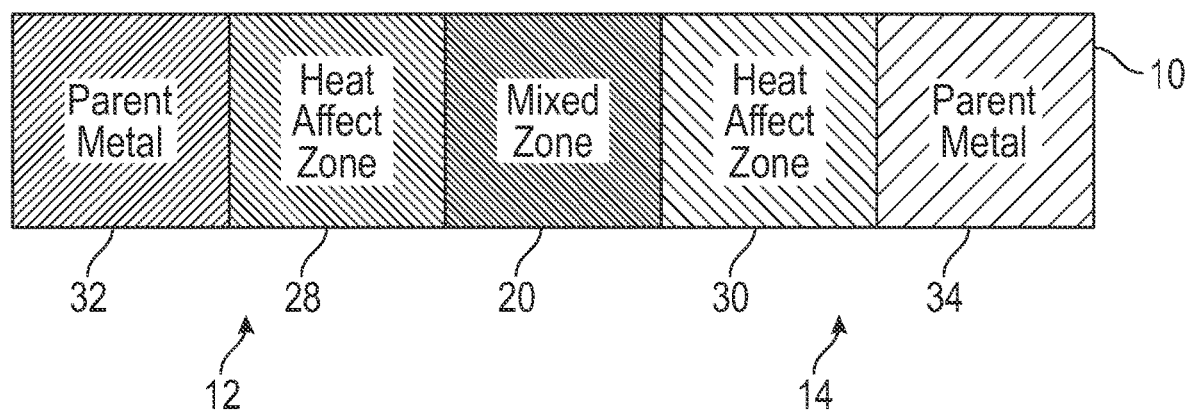
FIG. 1B is a side edge view of various zones relative to the mixed zoned.

Referring to FIG. 1A, a friction stir welded blank 10 is illustrated having a first panel 12 and a second panel 14. A friction stir weld 16 is illustrated joining the first panel 12 and the second panel 14.

Referring now also to FIGS. 1B-1E, the weld 16 is also referred to as a mixed zone 20 that is composed of a mixture of material from the first panel 12 and the second panel 14. The mixed zone 20 is formed by using a friction stir weld tool 22, 24, or 26 illustrated in FIG. 1C, 1D or 1E. The friction stir weld tools 22, 24, 26 is composed of tungsten carbide or another material that is harder than the advanced high strength steel forming the panels 12, 14. The friction stir weld tools 22, 24 and 26 rotate and melt a portion of each of the panels 12, 14 into the mixed zone 20. Heat is generated during the process and a heat affect zone 28, 30 that are directly adjacent to the mixed zone 20 is formed. The heat effect zone 28 is part of the first panel 12, while the second heat effect zone 30 is part of the second panel 14. The original metal is referred to as the parent metal 32, 34, which is not altered during the process. The parent 32 is adjacent to the heat effect zone 28 in the first panel 12. The parent metal 34 is adjacent to the heat effect zone 30 in the second panel 14.

The tool 22 is a cylindrical head that rotates about an axis of rotation 22A disposed in the longitudinal direction. The tool 24 is an adjustable probe friction stir weld tool that is cylindrical and rotates about the axis 24 but also moves axially in the direction of the longitudinal axis 22A. The tool 26 is a bobbin friction stir weld tool having three cylindrical regions 26A, 26B and 26C. Each region can have different diameters. However, in this example regions 26A and C have the same diameter and region 26B has a smaller diameter.

The material that the panels are composed of is different or the same. Combinations of conventional steel, advanced high strength steel or ultra-high strength steel are used. Advanced high strength steel has a tensile strength between 590 MPa and 1180 MPa. Ultra-high strength has a tensile strength greater than 1180 MPa and up to 2000 MPa in tensile strength. In some Examples, the panels 12, 14 have a microstructure that is composed of two different phases, such as ferrite, martensite, bainite, austenite or the like. The mixed zone 20 is joined below the heat treatment temperature and the material is therefore not substantially hardened. The heat effect zones 28, 30 are exposed to lower temperatures than welding and therefore are less thermally affected.

Figure 1C:
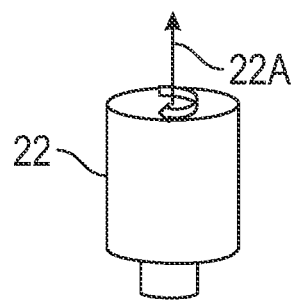
FIG. 1C is a perspective view of one example of a friction stir welding tool.
Figure 1D:
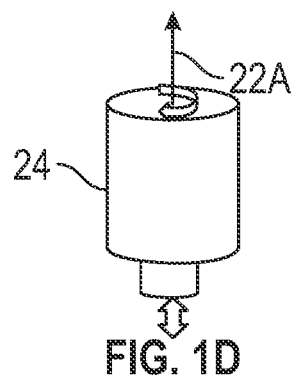
FIG. 1D is another example of an adjustable probe friction stir welding tool.
Figure 1E:
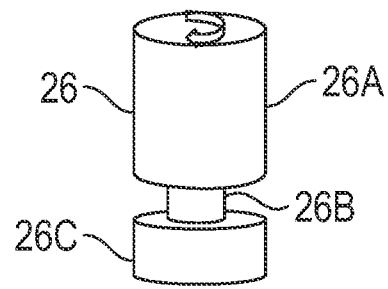
FIG. 1E is a bobbin friction stir welding tool.
Figure 2:
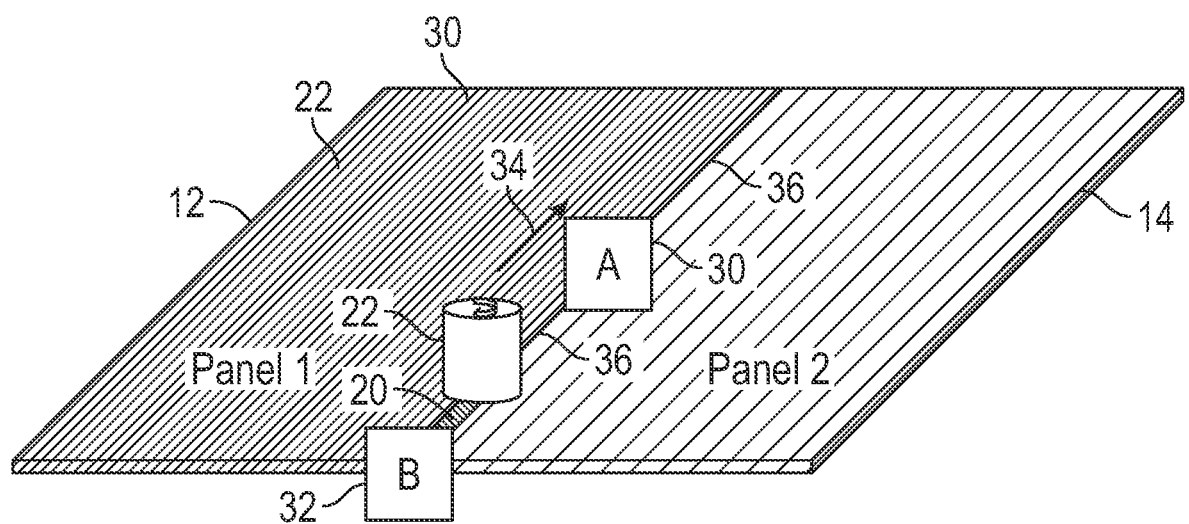
FIG. 2 is a perspective view of a pretreatment zone and a post-treatment zone relative to two panels being joined.

Referring now to FIG. 2, a tool for processing two panels is set forth. In this example, one of the friction stir weld tools 22, 24 or 26 illustrated in FIGS. 1C-1E are used. In this example, friction stir weld tool 22 is illustrated. A pre-treatment zone A and post treatment zone B are illustrated before and after the friction stir weld tool 22 during processing. The friction stir weld tool 22 moves in the direction illustrated by arrow 34. The pre-treatment zone A corresponds to a pre-treatment device 30 is therefore ahead of the friction stir weld tool 22. A joint area 36 is illustrated ahead of and being pre-treatment zone A where the weld will be formed between the edges of adjacent panels 12, 14. Pre-treatment device 30 includes but is not limited to a laser that is used for ablating coatings on one or both of the panels 12, 14. Examples of the pre-treatment device 30 include but are not limited to a laser, an induction heater or a plasma pretreating device. The post treatment device 32 corresponds to zone B and is a laser, an induction heater or a plasma post heater that is used to temper or reduce the hardness or stress relief after the mixed zone 20 is formed.

Figure 3:
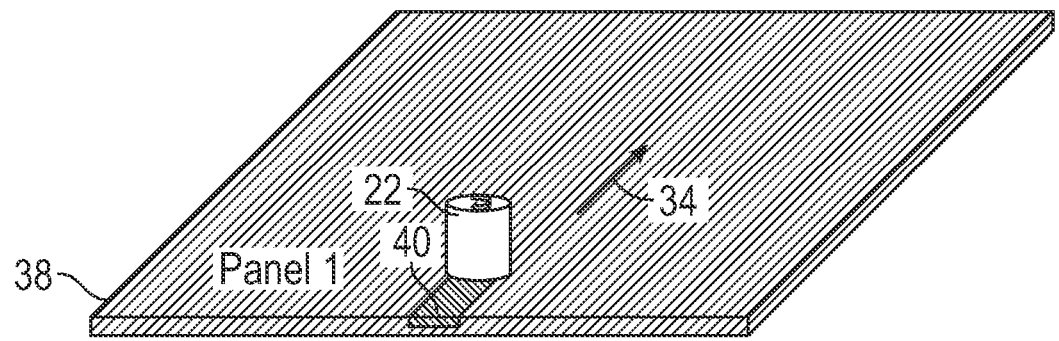
FIG. 3 is a perspective view of a single panel having a friction stir processed work hardened material.

Referring now to FIG. 3, a first panel 38 is also work hardened in this example. A friction stir weld tool, 22 in this example, is used to friction stir a specific depth less than the entire depth of the first panel 38 at a work hardened zone 40. The tool 22 moves in the direction 34 similar to that as above in FIG. 2. The zone 40 is formed in place by the tool 22. The grain structure is therefore refined without changing the thickness or joining to another panel. The yield strength after friction processing will approach the tensile strength of the material. The temperature that results during the friction stir welding process reduces some of the work hardening caused by the process. Work hardening is reduced if subsequent heat treatment process is employed. This process is conducted on a flat panel prior to forming or joining. Of course, pretreatment and post treatment zones, such as those illustrated in FIG. 2, is applied to FIG. 3. The work hardening process in linear or non-linear zones is similar to that illustrated in FIG. 4B below but in one panel rather than an edge of two panels.

Figure 4A:
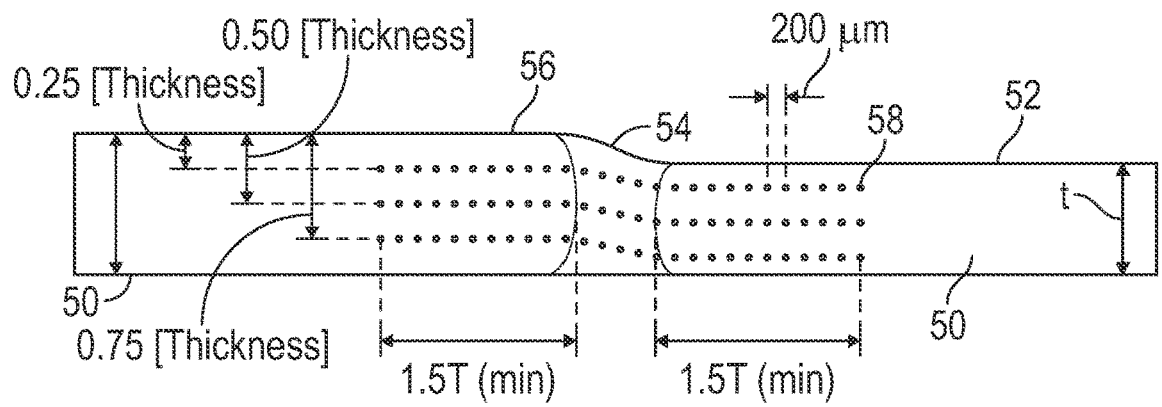
FIG. 4A is a side view of two different panels being joined.

Referring now to FIG. 4A, an end view of a first panel 50 having a thickness T is shown adjacent to a second panel 52 having a thickness t. Thickness t is less than thickness T. A mixed zone 54 shows an angular transition from the first thickness T to the second thickness t. The heat effect zones 56, 58 are at a minimum 1.5T. The remainder of the first panel 50 and the second panel 52, in this example, are the parent metal. A friction stir weld tool, such as those illustrated in FIGS. 1C-1E, is used to form the transition. When two different thicknesses were created using tailor rolling, the zones must be parallel to each other and normal to the direction of the coil.

Figure 4B:
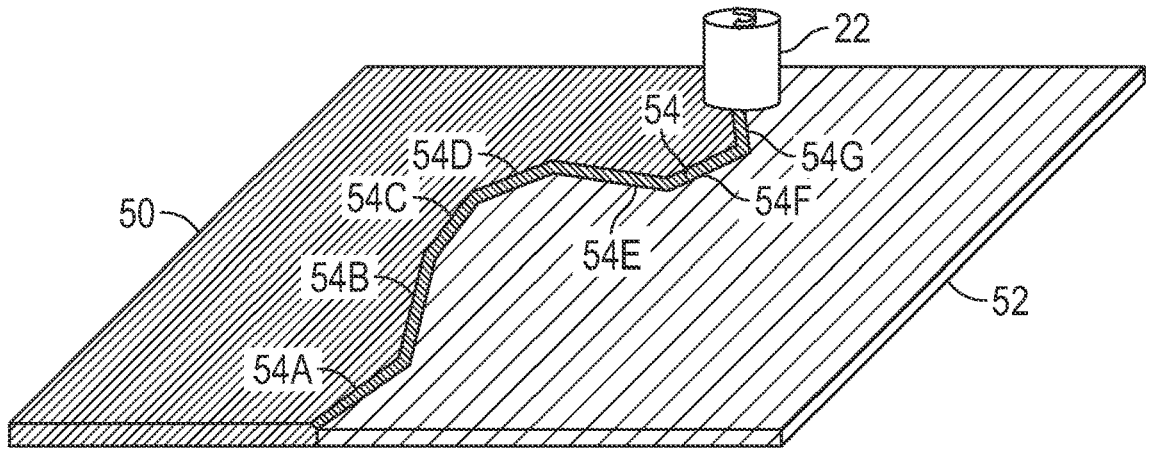
FIG. 4B is a perspective view of two panels begin joined illustrating the various nonlinearity of the mixed zone.
Figure 4C:
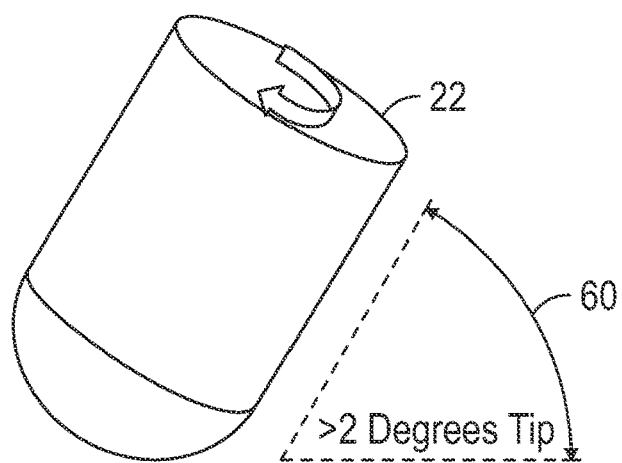
FIG. 4C is a side perspective view of a friction stir welding tool used at an angle relative to the normal position.

Referring now to FIGS. 4B and 4C, one example of the flexibility of the system is the use of the mixed zone 54 not being parallel to each other and normal to the direction of a rolling coil. In this example, a plurality of segments 54A-54G form the mixed zone 54. In this case, the segments 54A-54G of the mixed zone 54 are not parallel or colinear with each other (although some could be). The segments 54A-54G are at various angles relative to each other and the various edges. That is, none or some of the segments 54A-54G have to be parallel to the various edges. In FIG. 4C, the tool 22 has an angle 60 which is less than 90°. The angle of 90° corresponds to that being normal to the plane of the first panel 50 and the second panel 52.

Figure 5:
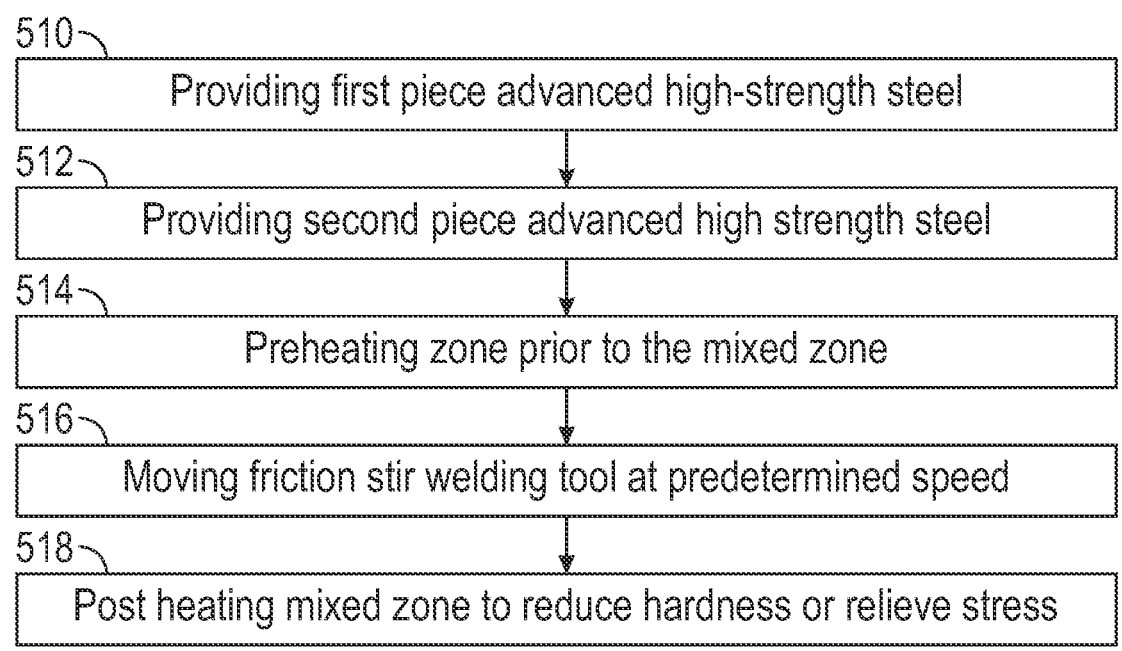
FIG. 5 is a flowchart of a method for operating the friction stir welding tool.

Referring now to FIG. 5, a method of friction stir welding one or two pieces of advanced high strength steel is set forth. An example of the advanced high strength steel is ultra-high strength steel. As mentioned above, the tensile strength of the advanced high strength steel is between 590 MPa and 1180 MPa. If ultra-high strength steel is used, the tensile strength is greater than 1180 MPa and up to 2000 MPa. As mentioned above, treating (such as hardening) an area on one piece of steel is performed and therefore step 512 can be eliminated in such circumstances.

In step 514, the zone prior to friction stir welding tool in an area that will eventually become the mixed zone is preheated. The preheating zone is heated using various processes or devices set forth above. Ultimately, a specific or predetermined temperature is desired to be achieved during the process. That is, in step 516, the friction stir welding tool is moved at a predetermined speed. The friction generates heat and that heat in combination with the preheating zone heats the temperature of the material or the materials to be joined to a predetermined temperature. In one example, the friction stir welding tool travels between 500 mm per minute and 3000 mm per minute. The combination of the preheating and the heating from the friction of the friction stir welding is between the critical eutectoid temperature and the forge welding temperature of the material. In one example, between 727 C and 1250 C was used. In another example, the joining temperature is greater than 1250 C and less than 1500 C. In one example, greater than 50% of the heat apply to the preheating zone is greater than 50% of the heat. That is, more than half the heat is applied to the preheating zone from an external source and less than half is provided by the friction stir welding tool. The relative fraction of heat input between friction and pre-heat is variable and based on the steel strength and the traveling speed.

In step 518, a mixed zone is optionally post heated to reduce hardness or relieve stress. Lower temperatures than preheating are used. In one example, the temperature of the heating of the mixed zone was greater than 180 C and then 500 C. More preferably, the post treatment temperature ranges between 300 C and 400 C, however, some values are time dependent and material strength and thickness dependent.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of processing high-strength steel comprising:
   providing a first piece of high-strength steel having a tensile strength between 590 MPa and 2000 MPa;
   friction stir processing the first piece of high-strength steel by;
     pre-heating a preheating zone area in advance of a friction stir welding tool; and
     moving the friction stir welding tool between 500 mm and 3000 mm per minute to attain a mixed zone having a mixed zone temperature at the mixed zone between a eutectoid temperature of the high-strength steel of 727 C and a forge welding temperature of the high-strength steel of 1500 C from a combination of the friction from the friction welding tool and the step of pre-heating, wherein the step of pre-heating provides more than half of a heat at the mixed zone and moving the friction stir welding tool provides less than half of the heat at the mixed zone.

2. The method of claim 1 further comprising post-heating the mixed zone to a temperature between 180 C and 500 C.

3. The method of claim 1 further comprising post heating the mixed zone to a temperature between 300 C and 400 C.

4. The method of claim 1 wherein the mixed zone is non-linear.

* * * * *